United States Patent [19]

Yamashita et al.

[11] Patent Number: 4,906,836

[45] Date of Patent: Mar. 6, 1990

[54] INTEGRATED CIRCUIT USING LOGARITHMIC AMPLIFIER

[75] Inventors: Tomitaka Yamashita; Mikio Kyomasu, both of Shizuoka, Japan

[73] Assignee: Hamamatsu Photonics Kabushiki Kaisha, Shizuoka, Japan

[21] Appl. No.: 248,506

[22] Filed: Sep. 23, 1988

[30] Foreign Application Priority Data

Sep. 24, 1987 [JP] Japan ................................ 62-239693

[51] Int. Cl.$^4$ .............................................. G01J 3/50
[52] U.S. Cl. ................................. 250/226; 250/214 A
[58] Field of Search ............... 250/214 R, 214 A, 208, 250/209, 578, 226, 214 L; 356/222, 223; 328/145

[56] References Cited

U.S. PATENT DOCUMENTS

| 4,309,604 | 1/1982 | Yoshikawa et al. | 356/223 |
| 4,379,636 | 4/1983 | Yoshida | 250/226 |
| 4,568,978 | 2/1986 | Cosh | 328/145 |

Primary Examiner—David C. Nelms
Attorney, Agent, or Firm—Finnegan, Henderson, Farabow, Garrett and Dunner

[57] ABSTRACT

An integrated circuit includes an operational amplifier having inverting and noninverting input terminals, a first logarithmic amplifier having inverting and noninverting input terminals, and a second logarithmic amplifier having inverting and noninverting input terminals. The output of the first logarithmic amplifier is connected to the noninverting input terminal of the second logarithmic amplifier, and the output of the second logarithmic amplifier is connected to the inverting input terminal of the operational amplifier.

8 Claims, 2 Drawing Sheets

INTEGRATED CIRCUIT USING LOGARITHMIC AMPLIFIER

BACKGROUND OF THE INVENTION

1. Field of the Invention

The present invention relates to an integrated circuit using logarithmic amplifiers, which may be used in a color sensor.

2. Description of the Related Art

A typical conventional circuit using logarithmic amplifiers will be described with reference to FIG. 1.

In FIG. 1, the output of a logarithmic amplifier LOG1 is connected through a resistor $R_1$ to the inverting input terminal of an operational amplifier AMP1. The output of another logarithmic amplifier LOG2 is connected through a resistor $R_3$ to the noninverting input terminal of operational amplifier AMP1. Output $e_1$ of amplifier LOG1 is fed back to the inverting input terminal of the amplifier LOG1, via a diode $D_1$. Similarly, output $e_2$ of amplifier LOG2 is fed back to the inverting input terminal of amplifier LOG2 via a diode $D_2$.

In this conventional circuit, output $e_1$ of amplifier LOG1 is expressed as:

$$e_1 = V_T \ln (I_{f1}/I_{s1}) \quad (1)$$

and output $e_2$ of amplifier LOG2 likewise is expressed as:

$$e_2 = V_T \ln (I_{f2}/I_{s2}) \quad (2)$$

where $I_{f1}$ and $I_{f2}$ designate the current flowing through the feedback circuits, via diodes $D_1$ and $D_2$, of amplifiers LOG1 and LOG2, respectively. $I_{s1}$ and $I_{s2}$ designate the reverse saturation current of diodes $D_1$ and $D_2$, respectively. $V_T = KT/q$, where "q" represents a quantity of charge as given by $1.6 \times 10^{-19}$ (C), K the Boltzmann constant as given by $1.38 \times 10^{-23}$ (J/K), and T an absolute temperature.

Output $e_0$ of operational amplifier AMP1 is expressed as:

$$e_0 = \frac{R_2}{R_1}\left(\frac{R_1 R_4/R_2 + R_4}{R_3 + R_4}\right)e_2 - \frac{R_2}{R_1} e_1 \quad (3)$$

If $R_1 = R_3$ and $R_2 = R_4$, and no matching error exists with respect to resistors $R_1$ and $R_2$, output $e_0$ becomes:

$$e_0 = \frac{R_2}{R_1}(e_2 - e_1) \quad (4)$$

Substituting equations (1) and (2) for equation (4), $e_0$ can be written as:

$$e_0 = \frac{R_2}{R_1} \cdot V_T \ln\left(\frac{I_{f2}}{I_{f1}} \cdot \frac{I_{s1}}{I_{s2}}\right) \quad (5)$$

Equation (5) is obtained on the assumption that $R_1 = R_3$ and $R_2 = R_4$, and no matching errors exist with respect to resistors $R_1$ and $R_2$. The matching error, however, exists in a semiconductor integrated circuit and causes a gain error. If the matching error is considered so that the resistance of each resistor is defined as:

$R_1 = R_1 + \Delta R_1$
$R_2 = R_2 + \Delta R_2$
$R_3 = R_1 + \Delta R_3$
$R_4 = R_2 + \Delta R_4$ then equation (3) becomes equation (6)' shown in Table 1. For obtaining the error component contained in the output voltage, equation (6)' is modified as equation (6)'' shown in Table 1. Substituting equations (1) and (2) for equation (6)'', we have equation (6) as shown in Table 1, where A and B are defined as:

$$A = (1 - \Delta R_1/R_1 + \Delta R_2/R_2),$$

$$B = -(1 - \Delta R_1/R_1 + \Delta R_2/R_2) \times$$

$$\left(\frac{\Delta R_3 - \Delta R_1 - R_1/R_2(\Delta R_4 - \Delta R_2)}{R_1 + R_2}\right)$$

TABLE 1 equation (6)'
$$e_0 = \frac{R_2 + \Delta R_2}{R_1 + \Delta R_1}\left\{\frac{(R_1 + \Delta R_1)(R_2 + \Delta R_4)/(R_2 + \Delta R_2) + (R_2 + \Delta R_4)}{(R_1 + \Delta R_3) + (R_2 + \Delta R_4)}\right\}e_2 - \frac{R_2 + \Delta R_2}{R_1 + \Delta R_1}e_1$$

equation (6)''
$$e_0 = \frac{R_2}{R_1}\left[(1 - \Delta R_1/R_1 + \Delta R_2/R_2)(e_2 - e_1) - (1 - \Delta R_1/R_1 + \Delta R_2/R_2) \times \left(\frac{\Delta R_3 - \Delta R_1 - \frac{R_1}{R_2}(\Delta R_4 - \Delta R_2)}{R_1 + R_2}\right)e_2\right]$$

equation (6)
$$e_0 = \frac{R_2}{R_1}\left[(1 - \Delta R_1/R_1 + \Delta R_2/R_2)\ V_T \ln\left(\frac{I_{f2}}{I_{f1}} \cdot \frac{I_{s1}}{I_{s2}}\right) - (1 - \Delta R_1/R_1 + \Delta R_2/R_2) \times \left(\frac{\Delta R_3 - \Delta R_1 - \frac{R_1}{R_2}(\Delta R_4 - \Delta R_2)}{R_1 + R_2}\right)V_T \ln\left(\frac{I_{f2}}{I_{s2}}\right)\right]$$

TABLE 1-continued $$= \frac{R_2}{R_1}\left[A \cdot V_T \ln\left(\frac{I_{f2}}{I_{f1}} \cdot \frac{I_{s1}}{I_{s2}}\right) + B\, V_T \ln\left(\frac{I_{f2}}{I_{s2}}\right)\right]$$

In equation (6), the term A represents the error component of output signal $e_0$, resulting from the matching error with respect to resistors $R_1$ and $R_2$ and the term B with respect to resistors $R_1$, $R_2$, $R_3$ and $R_4$.

For example, if we assume that the matching error is 3% at a maximum, so that when $R_1 = R_2 = 1$ kilo-ohm, $\Delta R_1 = 0$ ohm, $\Delta R_2 = 30$ ohms, $\Delta R_3 = 30$ ohms, and $\Delta R_4 = -30$ ohms, then the terms A and B in equation (6) become: A = 1.03 and B = -0.04635.

Furthermore, if we assume that $I_{f1} = 10$ uA, $I_{f2} = 20$ uA, $I_{s1} = I_{s2} = 3.5 \times 10^{-16}$ A, and $V_T = 0.0257$ V, then, the term $B \cdot V_T \ln (I_{f2}/I_{s2})$ in equation (6) becomes $$|B \cdot V_T \ln (I_{f2}/I_{s2})| = 0.0295 \text{ V}$$

On the other hand, if we assume that no matching error exists, then equation (3) gives voltage $e_0$ as:

$$e_0 = 0.0178 \text{ V} \tag{3'}$$

That is, the error component is larger than the output voltage obtained from equation (3) where no matching error with respect to resistors was assumed to exist. This indicates that the circuit in FIG. 1 will produce and output signal containing a large error resulting from the matching error with respect to the resistors, inherent in the semiconductor integrated circuit.

FIG. 2 shows an application of the conventional circuit shown in FIG. 1 to an amplifier circuit for a color sensor. In this circuit, a photo diode R-PD is connected between the inverting and noninverting input terminals of a logarithimic amplifier LOG/R. Another photo diode G-PD is connected between the inverting and noninverting input terminals of another logarithmic amplifier LOG/G. The front face of photo diodes R-PD and G-PD are covered with red (R) and green (G) color filters, respectively. Light is transmitted through these color filters before being transformed into photo currents $I_{shR}$ and $I_{shG}$.

In FIG. 2, photo currents $I_{shR}$ and $I_{shG}$ are fed back, via diodes $D_R$ and $D_G$, respectively, into logarithmically compressed voltages. The output terminals of logarithmic amplifiers LOG/G and LOG/R are coupled with the noninverting input terminal and the inverting input terminal, respectively, of an operational amplifier AMP3. The output voltage containing the photo current ratio of $(I_{shG}/I_{shR})$ as a color difference signal appears at output $e_0$ of amplifier AMP3. Output $e_0$ includes the error component as shown in equation (6) of Table 1. However, the ratio $(I_{shG}/I_{shR})$ in the color sensor varies very minutely. Furthermore, the second term of equation (6) varies with the voltage at the noninverting input terminal of amplifier AMP3. Therefore, the second term in equation (6) cannot be treated as a mere offset. This causes a large error in the final output voltage.

SUMMARY OF THE INVENTION

The present invention overcomes the problems and disadvantages of the prior art. Accordingly, an object of the present invention is to provide an integrated circuit which reduces the error contained in the output of an operational amplifier succeeding two logarithmic amplifiers, even when the matching error exists with respect to the resistors used in the semiconductor integrated circuit.

To achieve the object and in accordance with the purpose of the present invention as embodied and broadly described herein, the circuit of this invention comprising first and second logarithmic amplifiers is arranged so that the output of the first logarithmic amplifier is connected to the noninverting input terminal of the second amplifier; and the output of the second logarithmic amplifier is connected to an inverting input terminal of an operational amplifier.

In the circuit of this invention, the output error consists of only the component resulting from the matching error with respect to only two resistors, i.e., a first resistor disposed between the output of the second logarithmic amplifier and the inverting input terminal of the operational amplifier and a second resistor disposed in the feedback circuit of the operational amplifier.

The accompanying drawings, which are incorporated in and constitute a part of this specification, illustrates one embodiment of the present invention and, together with the description, serve to explain the principles of the invention.

BRIEF DESCRIPTION OF THE DRAWINGS

FIG. 5 shows a color filter for each color sensor incorporated in the circuit of FIG. 3.

DESCRIPTION OF THE PREFERRED EMBODIMENTS

Reference will now be made in detail to the present preferred embodiment of the invention, an example of which is illustrated in the accompanying drawings.

Figure 1:
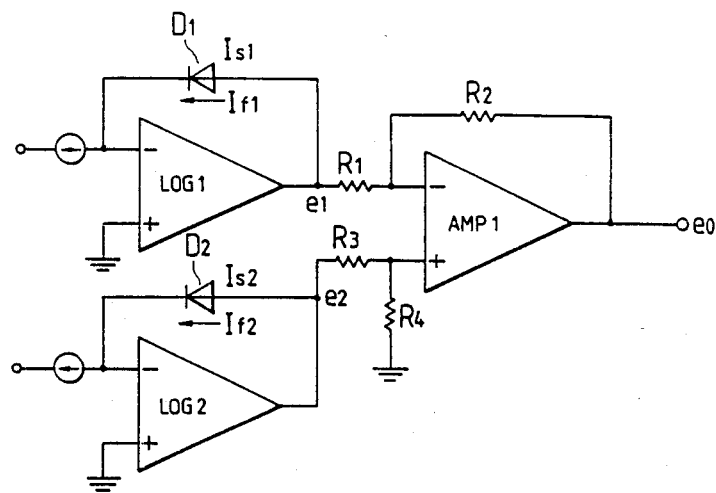
FIG. 1 is a circuit diagram of the prior art.
Figure 2:
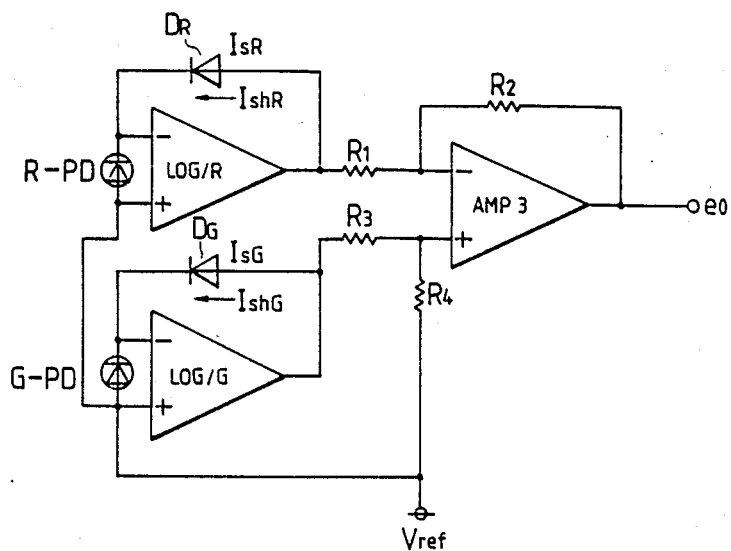
FIG. 2 is a circuit diagram of a conventional color difference signal output circuit.
Figure 3:
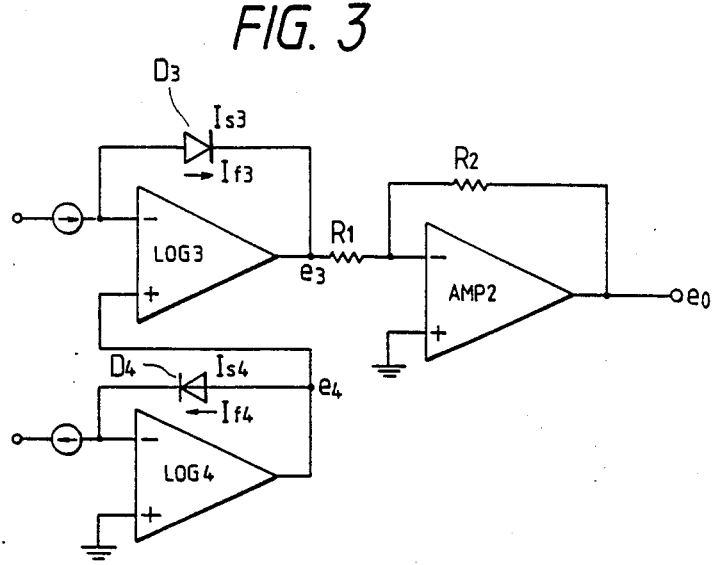
FIG. 3 is a circuit diagram of the present invention.

The preferred embodiment of the circuit is shown in FIG. 3. The output of a first logarithmic amplifier LOG4 is connected to the noninverting input terminal of a second logarithmic amplifier LOG3. The output of amplifier LOG3 is connected, through a resistor $R_1$, to the inverting input terminal of an operational amplifier AMP2. Diodes $D_3$ and $D_4$ are provided in the feedback circuit of amplifiers LOG3 and LOG4, respectively. The noninverting input terminal of amplifiers LOG4 and AMP2 is connected to a common ground.

In this circuit arrangement, output $e_4$ of logarithmic amplifier LOG4 is given by $$e_4 = V_T \ln (I_{f4}/I_{s4}) \tag{7}$$

From equation (7), output $e_3$ of logarithmic amplifier LOG3 becomes $$e_3 = V_T \ln \frac{I_{f4}}{I_{s4}} - V_T \ln \frac{I_{f3}}{I_{s3}} \quad (8)$$

$$= V_T \ln \left( \frac{I_{f4}}{I_{f3}} \cdot \frac{I_{s3}}{I_{s4}} \right)$$

Assuming that the circuit does not include a matching error with respect to resistors $R_1$ and $R_2$, then the output is given by $$e_0 = \frac{R_2}{R_1} V_T \ln \left( \frac{I_{f4}}{I_{f3}} \cdot \frac{I_{s3}}{I_{s4}} \right) \quad (9)$$

In the semiconductor integrated circuit, however, the circuit includes a matching error. If the matching error is considered so that resistors $R_1$ and $R_2$ are defined as: $R_1 = R_1 + \Delta R_1$ and $R_2 = R_2 + \Delta R_2$, then equation (9) becomes:

$$e_0 = (1 - \Delta R_1/R_1 + \Delta R_2/R_2) \times V_T \ln \left( \frac{I_{f4}}{I_{f3}} \cdot \frac{I_{s3}}{I_{s4}} \right) \quad (10)$$

$$= \frac{R_2}{R_1} \cdot A \cdot V_T \ln \left( \frac{I_{f4}}{I_{f3}} \cdot \frac{I_{s2}}{I_{s4}} \right)$$

where $A = (1 - \Delta R_1/R_1 + \Delta R_2/R_2)$.

When equation (10), relating to the present invention, is compared to equation (6), relating to the prior art, it is seen that equation (10) does not contain the second term B in equation (6), containing only the first term A, which varies with the matching error with respect to resistors $R_1$ and $R_2$ only. When the above-mentioned values are given in equation (10), $A = 1.03$ so that the error contained in the output of the circuit of this invention is only 3% of the output voltage obtained from equation (3) where no matching error is assumed. This demonstrates that the aforesaid problems and disadvantages are successfully overcome.

Figure 4:
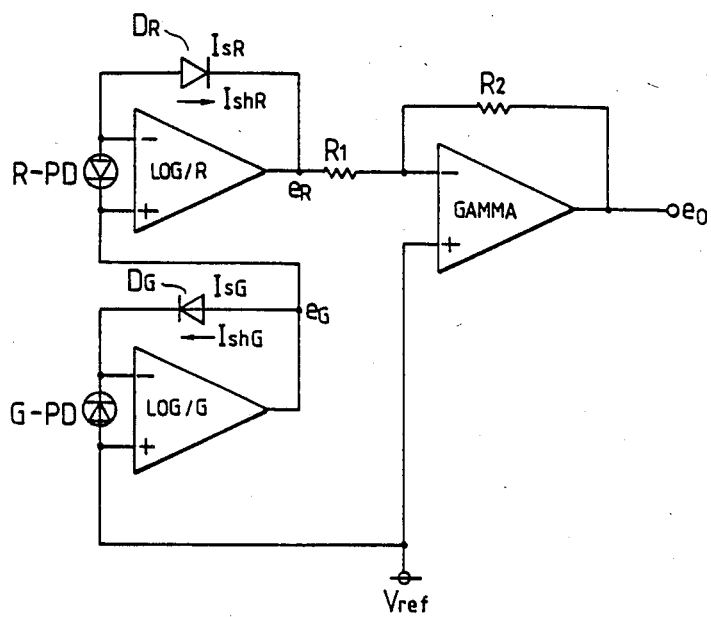
FIG. 4 is a circuit diagram of a color difference signal output circuit incorporating the circuit of FIG. 3.

FIG. 4 shows a color difference signal output circuit for a color sensor incorporating the circuit of the present invention shown in FIG. 3. Specifically, this is a circuit for obtaining a color difference signal in the form of the ratio between photo currents $I_{shR}$ and $I_{shG}$ as light is transmitted through red and green color filters, respectively, as shown in FIG. 5. The noninverting input of amplifier LOG/G and GAMMA is connected to a common reference voltage.

A first logarithmic amplifier LOG/G converts photo current $I_{shG}$ into an output voltage $e_G$ as:

$$e_G = V_T \ln (I_{shG}/I_{sG})$$

Voltage $e_G$ is connected to the noninverting input terminal of a second logarithmic amplifier LOG/R. Upon receiving voltage $e_G$, amplifier LOG/R produces an output voltage $e_R$ as:

$$e_R = V_T \ln \left( \frac{I_{shG}}{I_{shR}} \cdot \frac{I_{sR}}{I_{sG}} \right)$$

In the circuit shown in FIG. 4, an inverting (noninverting) amplifier GAMA succeeding amplifyier LOG/R provides a "γ(gamma)" correction with an extremely high precision.

As seen from the foregoing description, the circuit of the present invention reduces the error contained in the output in a circuit, even when the circuit contains the matching error due to the resistors used. The error in the output of the operational amplifier contains only the component resulting from the matching error with respect to only two resistors, one resistor disposed between the output of the second logarithmic amplifier and the inverting input terminal of the operational ampliffier, and the other resistor disposed in the feedback circuit of the operational amplifier.

It will be apparent to those skilled in the art that various modifications and variations can be made in the circuit of the present invention. Thus, it is intended that the present invention covers the modifications and variations of this invention provided they come within the scope of the appended claims and their equivalents.

What is claimed is:

1. An integrated circuit for comparing first and second signals, comprising:
    an operational amplifier having inverting and noninverting input terminals, the output of said operational amplifier being coupled to the inverting input terminal of said operational amplifier, and the output of said operational amplifier containing a signal representing a comparison of said first and second signals;
    a first logarithmic amplifier having inverting and noninverting input terminals, the output of said first logarithmic amplifier being coupled to the inverting input terminal of said first logarithmic amplifier, and the inverting input terminal of said first logarithmic amplifier receiving said first signal;
    a second logarithmic amplifier having inverting and noninverting input terminals, the output of said second logarithmic amplifier being coupled to the inverting input terminal of said second logarithmic amplifier, and the inverting terminal of said second logarithmic amplifier receiving said second signal, the output of said first logarithmic amplifier being coupled to the noninverting input terminal of said second logarithmic amplifier, and the output of said second logarithmic amplifier being coupled to the inverting input terminal of said operational amplifier.

2. An integrated circuit according to claim 1, wherein
    a first resistor is disposed intermediate the output of the second logarithmic amplifier and the inverting input terminal of the operational amplifier so that the output of the second logarithmic amplifier is coupled to the inverting input terminal of the operational amplifier through the first resistor; and
    a second resistor is disposed intermediate the inverting input terminal of the operational amplifier and the output of the operational amplifier so that the inverting input terminal of the operational amplifier is coupled to the output of the operational amplifier through the second resistor.

3. An integrated circuit according to claim 1, wherein the noninverting input terminal of the first logarithmic amplifier and the operational amplifier is connected to a common ground.

4. An integrated circuit according to claim 1, further comprising a first diode disposed intermediate the inverting input terminal of the first logarithmic amplifier and the output of the first logarithmic amplifier so that the inverting input terminal of the first logarithmic amplifier is coupled to the output of the second logarithmic amplifier through the first diode; and a second diode disposed intermediate the inverting input terminal of the second logarithmic amplifier and the output of the second logarithmic amplifer so that the inverting input terminal of the second logarithmic amplifier is coupled to the output of the second logarithmic amplifier through the second diode.

5. An integrated circuit according to claim 1, further comprising:

a first photosensitive element having a first end being connected to the inverting input terminal of said first logarithmic amplifier and a second end being connected to the noninverting input terminal of said first logarithmic amplifier, and a second photosensitive element having a first end being connected to the inverting input terminal of said second logarithmic amplifier and a second end being connected to the noninverting input terminal of said second logarithmic amplifier.

6. An integrated circuit according to claim 5, wherein the noninverting input terminal of said first logarithmic amplifier and the noninverting input terminal of said operational amplifier are connected to a common reference voltage.

7. An integrated circuit according to claim 6, wherein said first and second photosensitive elements are sensitive to light rays containing different colors.

8. An integrated circuit according to claim 6, further comprising:

a first color filter covering the face of the first photosensitive element; and a second color filter covering the face of the second photosensitive element whereby light is transmitted through said color filters before being transformed into a photocurrent by said photosensitive elements.

* * * * *